(12) United States Patent
Lowry et al.

(10) Patent No.: US 11,781,397 B2
(45) Date of Patent: Oct. 10, 2023

(54) INTEGRAL CHECK VALVE LOCK OPEN DEVICE FOR OIL AND GAS EQUIPMENT

(71) Applicants: George Todd Lowry, Magnolia, TX (US); Christopher Len Jackson, Corpus Christi, TX (US)

(72) Inventors: George Todd Lowry, Magnolia, TX (US); Christopher Len Jackson, Corpus Christi, TX (US)

( * ) Notice: Subject to any disclaimer, the term of this patent is extended or adjusted under 35 U.S.C. 154(b) by 224 days.

(21) Appl. No.: 17/464,306

(22) Filed: Sep. 1, 2021

(65) Prior Publication Data

US 2022/0065065 A1 Mar. 3, 2022

Related U.S. Application Data

(60) Provisional application No. 63/073,669, filed on Sep. 2, 2020.

(51) Int. Cl.
| | | |
|---|---|---|
| *E21B 33/06* | (2006.01) | |
| *F16K 31/52* | (2006.01) | |
| *F16K 15/02* | (2006.01) | |
| *F16K 11/04* | (2006.01) | |
| *F16K 31/50* | (2006.01) | |
| *F16K 15/18* | (2006.01) | |
| *F16K 31/60* | (2006.01) | |
| *F16K 11/048* | (2006.01) | |

(52) U.S. Cl.
CPC ............ *E21B 33/06* (2013.01); *F16K 15/025* (2013.01); *F16K 15/182* (2021.08); *F16K 31/504* (2013.01); *F16K 31/52* (2013.01); *F16K 31/60* (2013.01); *F16K 11/048* (2013.01)

(58) Field of Classification Search
CPC ...... E21B 33/06; F16K 15/182; F16K 15/025; F16K 31/504; F16K 31/52; F16K 31/60
See application file for complete search history.

(56) References Cited

U.S. PATENT DOCUMENTS

| | | | | |
|---|---|---|---|---|
| 4,271,864 A | * | 6/1981 | Neff | G05D 16/10 137/599.09 |
| 4,744,285 A | * | 5/1988 | Presley | F15B 11/20 91/534 |
| 8,474,792 B2 | * | 7/2013 | Kubo | F16K 1/42 251/266 |
| 10,670,155 B2 | | 6/2020 | Patterson | |
| 11,111,933 B2 | * | 9/2021 | Desclee | B64C 13/00 |
| 2003/0192703 A1 | * | 10/2003 | Williams | E21B 34/00 166/376 |
| 2011/0266472 A1 | * | 11/2011 | Russell | E21B 21/106 251/28 |
| 2012/0145402 A1 | * | 6/2012 | Hilliard | E21B 34/06 166/312 |
| 2016/0017684 A1 | * | 1/2016 | Bourgoyne | E21B 34/16 166/53 |
| 2017/0097100 A1 | * | 4/2017 | Patterson | F16K 11/048 |
| 2018/0073648 A1 | * | 3/2018 | Wong | F16K 1/126 |
| 2019/0153802 A1 | | 5/2019 | Rao | |
| 2022/0065065 A1 | * | 3/2022 | Lowry | F16K 15/182 |
| 2022/0349275 A1 | * | 11/2022 | Shpak | E21B 33/06 |

* cited by examiner

*Primary Examiner* — Kevin R Barss
(74) *Attorney, Agent, or Firm* — M. Susan Spiering; Ochoa & Associates, P.C.

(57) ABSTRACT

An inventive lock open device for use with a poppet type check valve is disclosed. The device permits bidirectional flow of fluid or gas by defeating the check valve sealing device which permits hydrostatic testing without the need for check valve disassembly or the need for additional tooling.

18 Claims, 10 Drawing Sheets

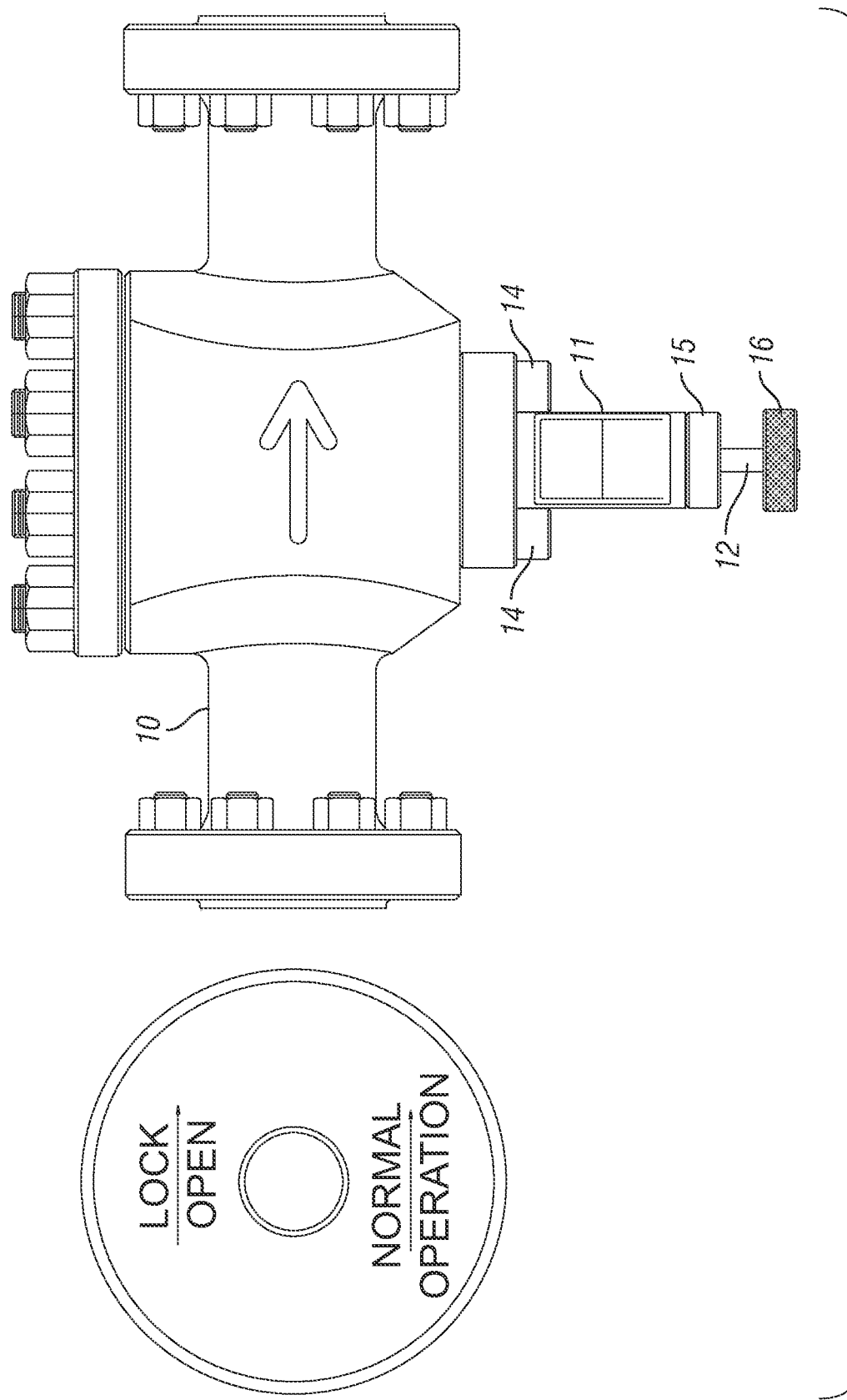

INTEGRAL CHECK VALVE LOCK OPEN DEVICE FOR OIL AND GAS EQUIPMENT

CROSS REFERENCE TO RELATED APPLICATIONS

This is a U.S. Non Provisional Application based on U.S. Provisional Application Ser. No. 63/073,669, filed on Sep. 2, 2020, entitled "Integral Check Valve Lock Open Device For Oil And Gas Equipment", the priority which is claimed and the disclosure of which is incorporated in its entirety.

FIELD OF THE INVENTION

This disclosure relates to an assembly of poppet type check valve in general, and more particular to a lock open device to work in combination with the poppet check valve to allow bidirectional flow.

BACKGROUND OF THE INVENTION

In the oil and gas drilling industry, traditionally poppet type check valves ("check valve(s)" or "poppet") are used on blowout preventer stacks to restrict the flow of pressure from returning to the well. The check valve permits flow in one direction, and the functioning mechanisms cannot be defeated without disassembly of the valve. The disassembly of the check valve to permit bidirectional flow during system testing creates an unnecessary risk of equipment malfunction and personnel safety.

Drilling contractors perform hydrostatic testing on their fluid or gas control equipment on location by circulating back through the kill line assembly. The check valve on the equipment prevents the testing in the reverse flow direction. Drilling rig personnel consistently remove the internal parts of the check valve to permit this reverse flow testing. Seldom are the parts reinstalled correctly and there is a risk of the check valve being reassembled incorrectly leading to failure of the equipment assembly, which is known to occur.

U.S. Pat. No. 10,670,155 is directed to a latching poppet valve for providing a hydraulic three way directional control valve. This does not meet the needs in the oil and gas industry for safely, easily and quickly conducting hydrostatic testing for a bidirectional operation.

Parker Hannifin Corp (www.parker.com) sells poppet check valves which can be manually opened and closed. This does not meet the needs of the industry because of pressure limitations (3000 psi) and would be used in petrochemical applications to control media different than that of the present invention.

Various locking pin mechanisms are known, for example, US Publ No. 2019/0153802 is directed towards a locking mechanism for subsea compact cutting device, and describes a hydaulically autuated locking mechanism for a pipe cutting system. The invention is used in conjunction with subsea or BOP gate valves, which is intended to sever drill pipes of control lines in the bore.

While bidirectional control valves, and locking pins for poppets are known in the industry, there currently is not a check valve available in the oil and gas industry for hydrostatic testing, that includes a device to lock open the check valve to allow bidirectional operation without valve disassembly and modification. This novel invention eliminates the stated risks and provides a much needed tool in the oil and gas industry.

SUMMARY OF THE INVENTION

An inventive lock open device for use with a poppet type check valve is disclosed. The device permits bidirectional flow of fluid or gas by defeating the check valve sealing device which permits hydrostatic testing without the need for check valve disassembly or the need for additional tooling. The device operates in the temperature range −20 F to 250 F and is suitable for H2S (hydrogen sulfide) service as defined in NACE MR0175.

The inventive check valve comprises a traditional poppet type check valve that meets Specification API 6A and incorporates an inventive lock open device that permits the user to manually defeat the internal sealing mechanism of the check valve and allow for bidirectional flow, without disassembly of the check valve unit. While the integral style valve is disclosed and exemplified, other styles can be employed with minor modifications to the assembly. The bidirectional fluid flow is needed to permit the user to hydrostatically test upstream devices such as mud pumps used in oil and gas drilling activities. The normal (i.e., prior art) unidirectional functioning of the check valve is accomplished by the poppet sealing against the seat, therefore stopping the flow of fluid in one direction. The conventional poppet and mechanism is defeated using the inventive locking screw, which pushes the poppet into the fully open position and locks it in place.

BRIEF DESCRIPTION OF THE DRAWINGS

FIG. 1D illustrates the locking device operation knob top view and side shown in lock open position;

DETAILED DESCRIPTION OF THE INVENTION

The invention is directed to redesign of the mechanical section of a piece of equipment having a poppet check valve, e.g., a blowout preventer or choke and kill manifold assembly, to allow for a penetration body (here a locking device), which is functioned manually to allow for bidirectional flow of fluid such as oil-, or allow flow of gas, and permit hydrostatic testing of the pressure control system of a drilling rig.

The following numbers represent the parts of the invention and preferred (but not exclusive) materials for making said part, as shown in the illustrations. The materials can be purchased from numerous vendors known in the industry.

1. Bonnet Stud, grade B7, API 20E BSL 1
2. Spring, 17-4PH or 410 SST or 718 INC
3. Seat Seal, HNBR (hydrogenated nitrile butadiene rubber)
4. Bonnet Gasket, HNBR
5. Packing, Viton 75
6. Bonnet nut, Grade 2H, API 20E, BSL 1
7. Bonnet, 4130 75K-NACE
8. Poppet, 17-4PH or 410 SST
9. Seat, 17-4PH or 410 SST
10. Check Valve Body, 4130 75K-NACE
11. Locking Device Body, 4130 75K-NITRIDED (QPQ)
12. Poppet Lock Screw, or Locking Screw, 17-4PH HH1150
13. O-ring, Viton
14. Socket Head Cap Screw, Grade 8
15. Locking Screw-Stop-, 4130 75K
16. Locking Screw Knob, 4130 75K
17. Set Screw-, Stainless Steel Wherein the following are further defined as:
17-4 PH is chromium nickel copper stainless steel with niobium;
410 SST is general stainless steel with chromium;
4130 is alloy steel with low carbon content;
NACA is National Association of Corrosion Engineers Assoc;
75K is an alloy steel;
HH1150 is a type of 17-4 PH. 17-4 PH is a precipitating stainless steel which is double heat treated at 1150 F degrees;
Nitrided is a heat processing treatment to infuse nitrogen onto a surface;
Viton is a fluropolymer elastomer.

Figure 1A:
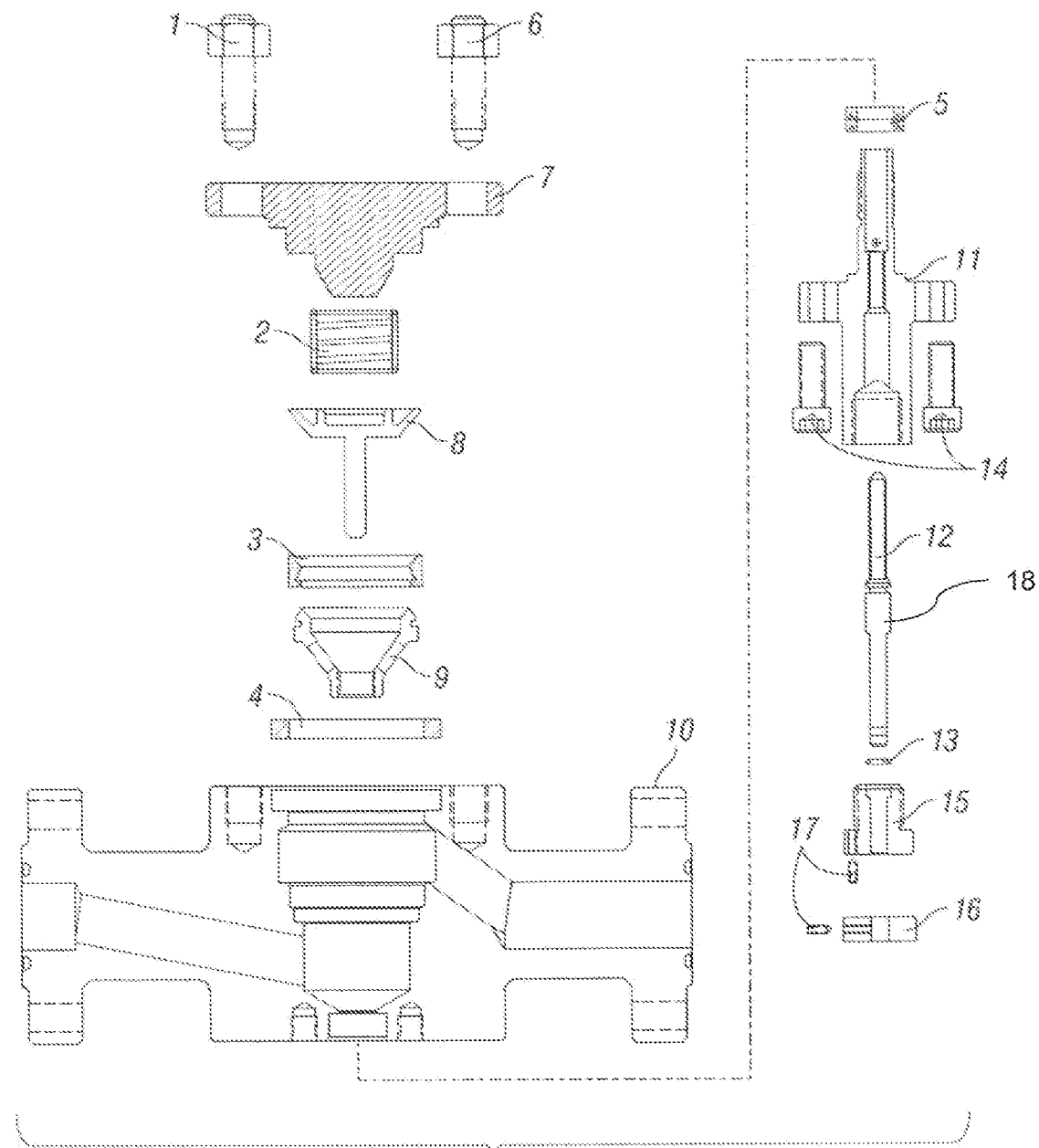
FIG. 1A illustrates the check valve assembly with the integral lock open device.

FIG. 1A illustrates the check valve assembly with the integral lock open device. The materials for each part are identified above. These are preferred but others known to those of skill in the art may be substituted and maintain the function of the inventive locking device. The invention shown in FIG. 1A is directed to an assembly of the Locking Device Body (11) that utilizes a Locking Screw (12) with an O-ring (13), which is attached to a Poppet Style Check Valve Assembly by means of two Socket Head Cap Screws (14) that hold the locking device centered in the lower part of the Check Valve Body (10). The Locking Device Body (11) replaces a traditional seat screw and retains the internal seat. The Locking Screw (12) utilizes an O-ring (13) on the outside diameter that seals against the internal surface of the Locking Device Body (11). The Locking Screw (12) has a pointed end to reduce the amount of surface contact with the Poppet (8) and the opposite end of the Locking Screw (12) is attached to the Locking Screw Knob (16) by means of a set screw (17). The Locking Screw (12) is prevented from being ejected from the assembly by means of a shoulder (18) on the Locking Screw (12) and the Locking Screw Stop (15). The check valve assembly is modified from normal operation to locked open operation by rotating the Locking Screw Knob (16) that is attached to the Locking Screw (12) by means of a set screw (17). Alternatively stated, the set screw (17) goes through the locking screw (12) and the knob (16). This is intentional so that the set screw (17) will shear if too much force is applied and prevent damage to the locking screw (12).

Rotating the locking screw (12) with the knob (16) clockwise applies force against the poppet (8) and lifts the poppet (8) from the seat (9) and the seat seal (3). The "unseating" safely defeats the sealing mechanism (the seat (9), the seat seal (3), and the poppet (8)). This position allows fluid or gas to travel freely in both directions and through both end connections. Rotating the Locking Screw (12) and knob (16) counterclockwise, removes all force from the check valve Poppet (8) and permits the sealing mechanisms to function properly and to allow fluid or gas flow in only one direction.

The locking device (11-17) functions without the need for disassembly or in-field modifications.

This inventive design has been validated using a protocol developed specifically for this design and in accordance with API Specification 6A. Testing was performed to performance requirement 1 ("PR1") instead of performance requirement 2 (PR2) because of the rubber sealing components of the design. PR1 uses fluid as the test media. PR2 uses nitrogen as the test media. Gas impregnates rubber, such as the seat seal (3) and when release test pressure would cause explosive decompression, this destroys the rubber seals. This is information known to those working in the field, and no art related to this has been found.

Gas testing can not be completed because explosive decompression will occur in the rubber sealing parts when using compressed nitrogen employed in testing requirements for PR2 of API 6A. Test API 6A is a functional test which the industry employs for validation testing for bidirectional valves. The design validation testing was conducted at ambient temperature and was re-verified multiple times. Calculations were conducted to meet API specification 6A and API 16C design requirements.

Check valve assembly and components were analyzed per requirements of API 6A, current edition and API 16C, current edition. The design, and all components, including stress features and bending moments were found to conform to these specifications. API 6X was the basis for the engineering analysis. This specification combines the applicable heavy wall cylinder analysis requirements of ASME Section VIII Div I and II and the distortion energy theory (Von Mises Distortion Criterion).

Dimensional features (flange face features) were examined for compliance and API specification 6A, current edition. When needed, stress calculations were performed on certain parts of the flange features.

The temperature rating for the design was confirmed suitable for service from −20F to 250 F. The working pressure of the locking device was confirmed suitable to 10,000 psi-, per API 6A and API 16C. Stress calculations were performed with a working pressure of 10,000 psi and a test pressure of 15,000 psi (per API 6A and 16C).

The materials conform to the requirements of NACE MR0175 including H2S partial pressure of 1.5 psi.

The inventive device was found to have a material class rating of EE-1.5 for the API 6A components.

For the design method verification, stress calculations primarily used the Distortion Energy Theory Methods (von Mises). However, Primary Membrane Stress was used in a few cases. All methods resulted in stresses below the maximum allowable stress per API 6A and 16C.

The material selected for the inventive integral locking device was SAE 4130 with a minimum specified yield strength of 75,000 psi-. It was found that all physical properties and chemistry in the material specification (TS 4130 6A) conformed to the requirements. TS is the technical specification for the 4130 material. 4130 can be modified in many ways, so all heat treatment, chemical composition and mechanical properties are specified in the TS.

The inlet end and outlet end connections of the check valve body (10) are 6BX flanged connectors conforming to API 6A requirements.

The thermal consideration loads are not considered since the temperature rating is between −20F and 250F. Thermal stresses are not a concern for this design.

Stress calculations verified that the pressure boundary penetrations conformed to requirements of maximum allowed stress.

References for the testing completed on the inventive device include, and the testing methods are incorporated by reference:

1. API 6A 21$^{st}$ Edition, Specification for Wellhead and Christmas Tree Equipment;
2. API 16C 2$^{nd}$ Edition, Choke and Kill Equipment;
3. API 6X 2$^{nd}$ Edition, Design Calculations for Pressure-Containing Equipment;
4. ASME BPVC Section VIII Div 1 & 2, 2019 Edition;
5. NACE MR0175 (ISO 15156-1, -2, -3) 3$^{rd}$ Edition; and,
6. API Technical Report 6AF2 Fifth Edition.

In summary, the inventive locking device passed all tests conducted to withstand pressures up to 30,000 psi, and above, and meet requirements for use out in the (oil and gas) field. Further, the device was field tested per API Standard 53, every 21 days, over a period of 12 months and the integral check valve lock open device withstood each test.

Figure 11A:
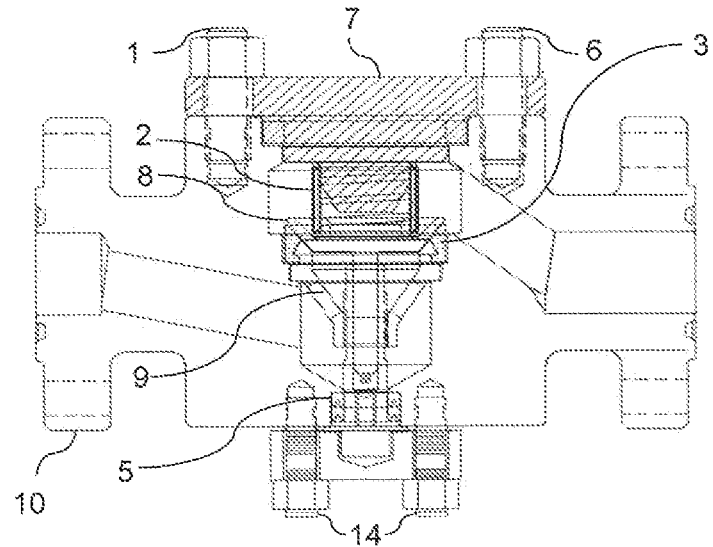
FIG. 11A illustrates a prior art check valve body with no lock device.
Figure 11B:
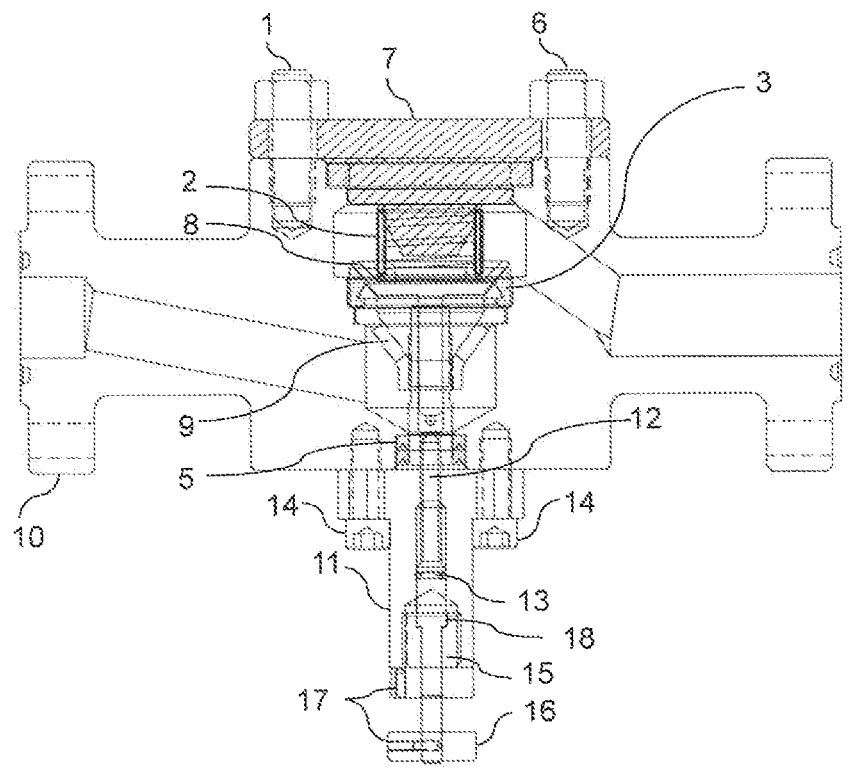
FIG. 11B illustrates a check valve body with the integral lock open device.

FIG. 11A illustrates the original or prior art, poppet style check valve. As can be seen there is no lock open device present. Under the prior art condition, the poppet (8) is removed from the top portion of the bonnet (7) by removing the studs (1, 6) and dismantling the poppet seat (9) and gasket (4), gasket (4) not shown in FIG. 11A. Upon removal, flow can now be in both directions and technicians or hydrostatic analyzers are able to test flow of fluid or gas in both directions. As stated above, this dismantling creates safety risks for the equipment and the technician, or others near by if there is error in the re-assembly process. The present invention is shown in FIG. 11B as a comparison and was created out of the need to easily hydrostatic test the equipment without the need to remove the poppet check valve. FIG. 11 B shows the locking mechanism on the lower portion of the check valve body (10) housing the inlet and outlet end connections.

Figure 1B:
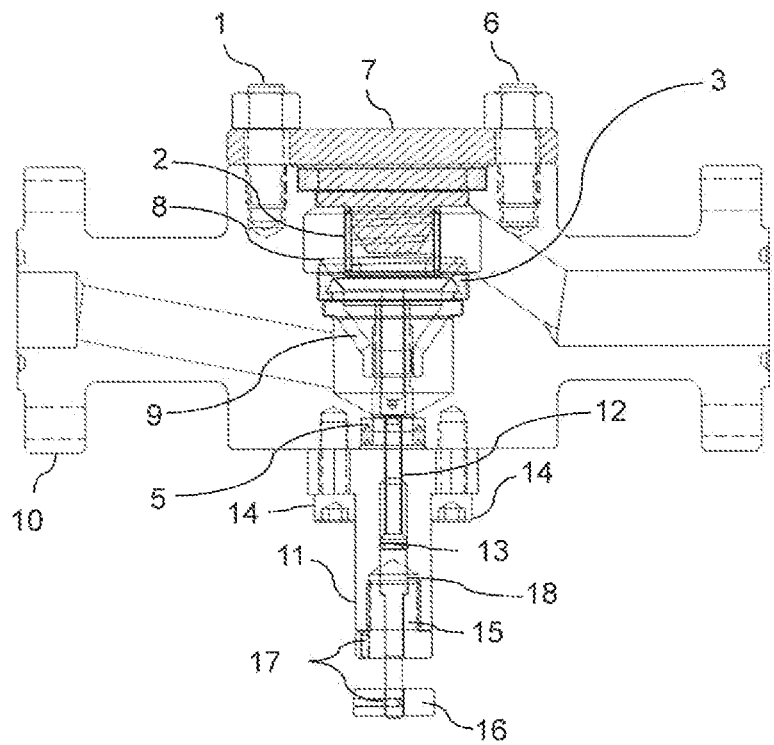
FIG. 1B illustrates the device assembled and in the unlocked, normal position.

FIG. 1B illustrates the device assembled and in the unlocked, normal position. Shown is the visual indicator where the knob (16) is separated from the locking device body (11), essentially seeing the separation between items 15 and 16.

Figure 1C:
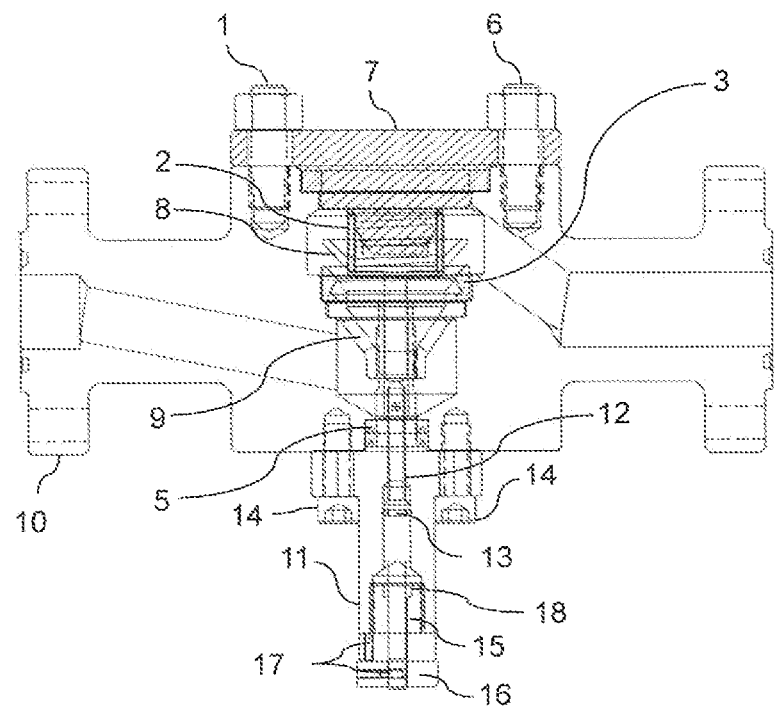
FIG. 1C illustrates the device in the locked, open position.

FIG. 1C illustrates the device in the locked, open position. The visual indicator shows the items 15 and 16 flush. The left side of the check valve body (10) shown is the inlet end connection, while the right hand side of the check valve body (10) shown is the outlet end connection. The direction of flow is typically from the inlet to the outlet. Flow is prevented from the outlet to the inlet indirection by way of the valve.

FIG. 1D illustrates the locking device operation knob (16) showing the lock/open or normal operation, and flow from the inlet to the outlet direction.

As seen from FIGS. 1A-D, the top portion of the inlet and outlet end connections house the poppet check valve including the bonnet stud (1, 6), the spring (2), the seat seal (3), the bonnet gasket (4), the bonnet (7), the poppet (8) and the seat (9). The lower portion of the check valve body (10) further includes the locking device body (11) the poppet lock screw (12), the locking screw stop (15) the locking screw knob (16) and the set screw (17). FIG. 1B illustrates the unlocked position of the locking device body (11) used during normal operations, and further shows a visual indicator knob (16) separated from the locking device body (11). This visual indicator, i.e., separation present between the knob (16) and the locking device, promotes ease in use and allows the operator to quickly determine whether the device is locked or open. FIG. 1C shows the locked open position and no separation between the knob (16) and the locking device. Here, the knob (16) is flush with the locking device. FIG. 1D illustrates that the lower portion of the knob (16) is marked for "lock/open" and "normal operation" position.

Figure 3:
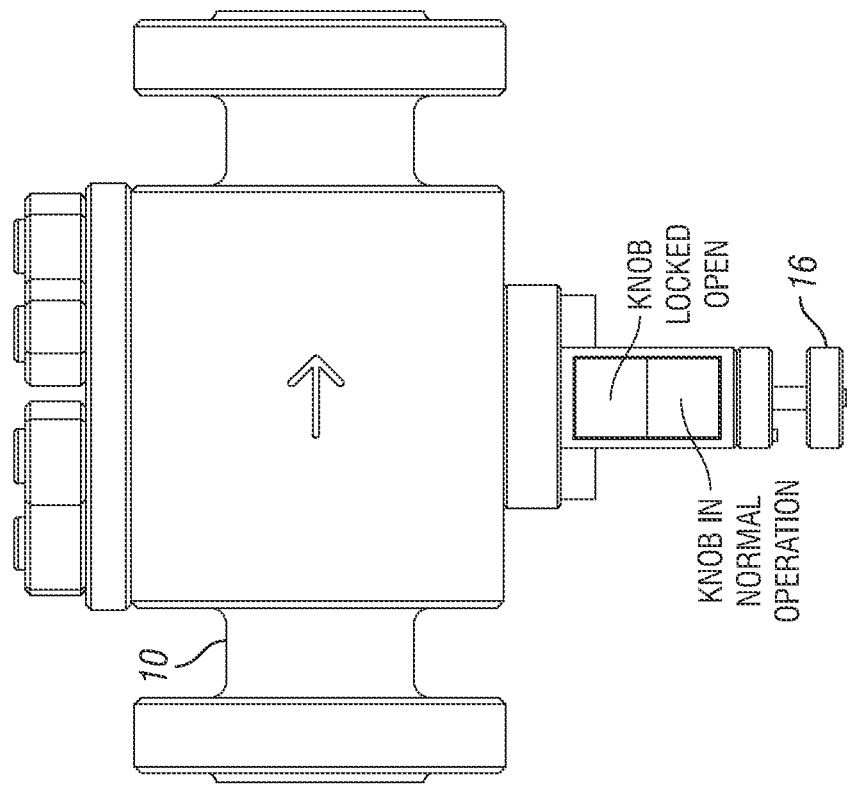
FIG. 3 illustrates the back side of FIG. 2, showing the exterior of the check valve body assembly with integral lock open device, along with an engraved arrow, depicting the direction of normal flow.
Figure 2:
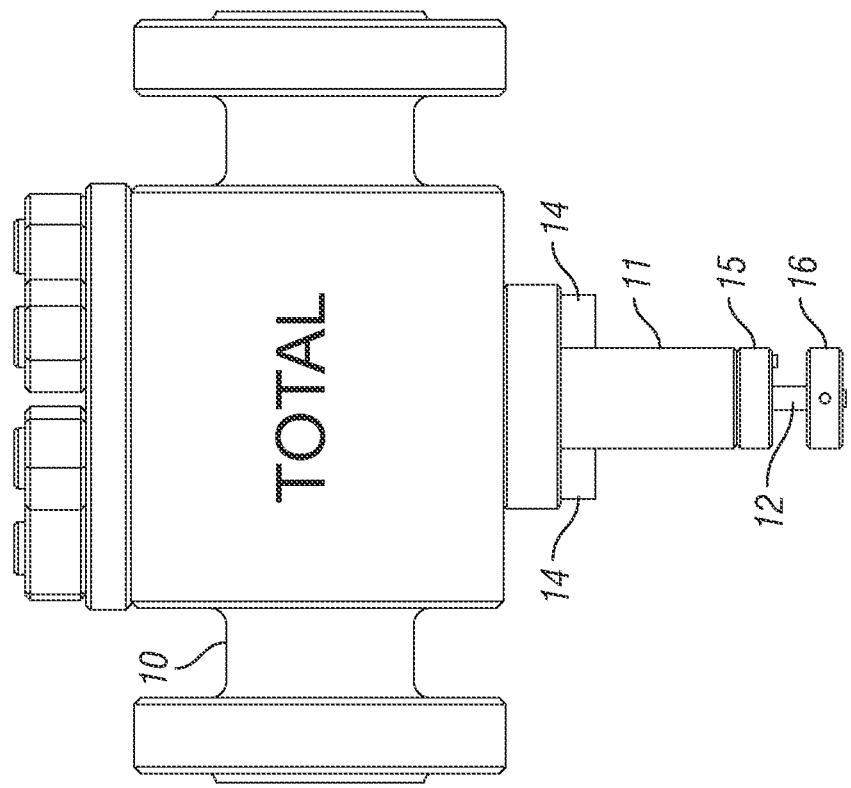
FIG. 2 illustrates the exterior of the check valve body assembly with integral lock open device.

FIG. 2 illustrates the check valve assembly with integral lock open device, in the unlock position and represents the front view of FIG. 3, i.e., FIG. 3 illustrating the rear view of FIG. 2. This unlock position is used during normal operations for fluid or gas flow in one direction. Also shown are the exterior of the inlet and outlet end connections on the check valve body (10).

FIG. 3 illustrates the check valve assembly with integral lock open device, in the unlock position, depicting the operation instruction label. FIG. 3 is the back view of FIG. 2 illustrating the lock device in the unlocked position, which is used during normal operations for fluid or gas flow in one direction. The engraved arrow on the body indicates the direction of normal flow.

Figure 4:
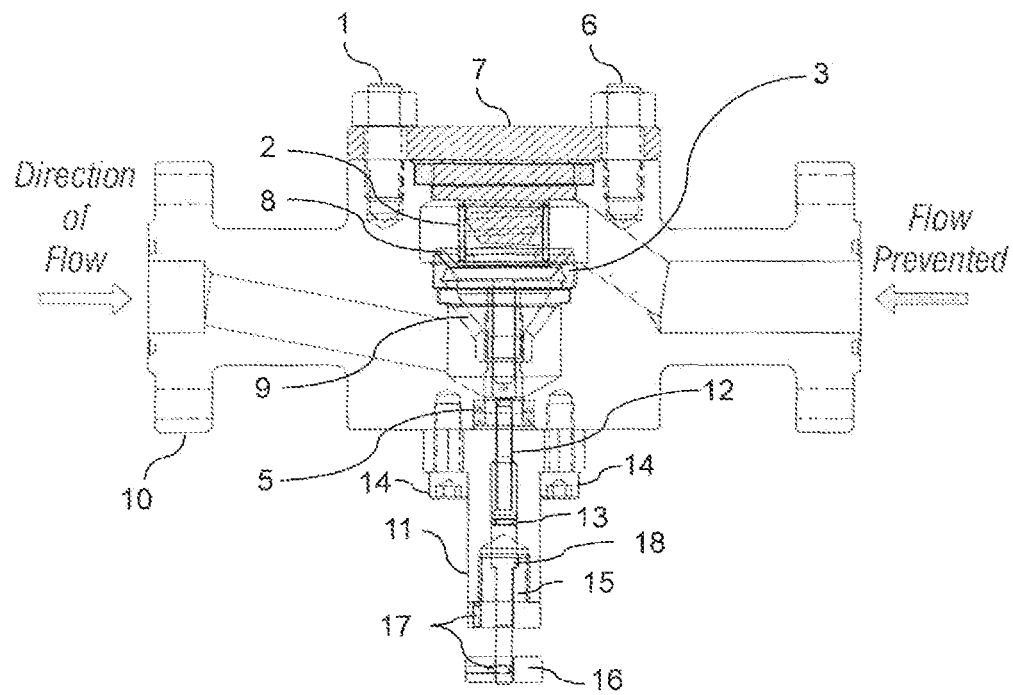
FIG. 4 illustrates the flow direction when the poppet is in the normal position.

FIG. 4 illustrates the flow direction in normal operation. The locking device is shown in the unlock position (with knob (16) separated from lock). Looking at FIG. 4 together with FIG. 1, one can see that fluid is permitted to flow in only one direction by lifting the poppet (8) off of the seat (9), breaking the seal (3). The flow is prevented in the opposite direction with the mechanical application of downward force applied by the spring (2) and then the additional force applied from fluid pressure acting against the poppet (8) and forcing it into the seal (3) and seat (9).

Figure 5:
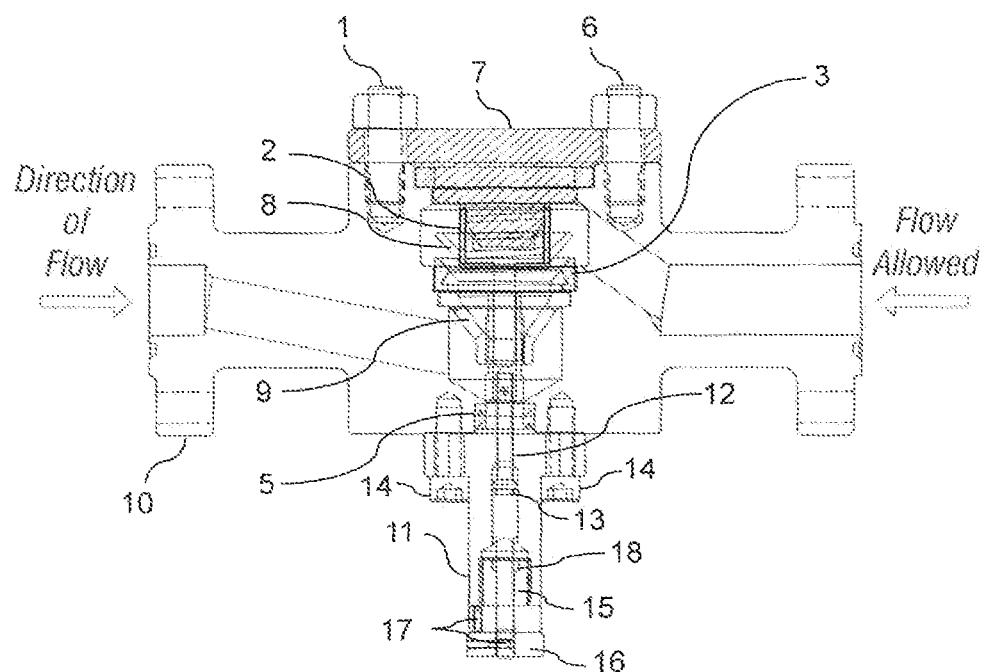
FIG. 5 illustrates the bi-directional flow when the poppet is locked open.

FIG. 5 illustrates the bi-directional flow when the poppet (8) is locked open (here the knob (16) is flush with the locking device body (11)). As the knob (16) is turned, the locking screw (12) lifts the poppet (8) from the seat (9) and locks it in the fully open position permitting fluid to flow in both directions unimpeded.

Figure 6:
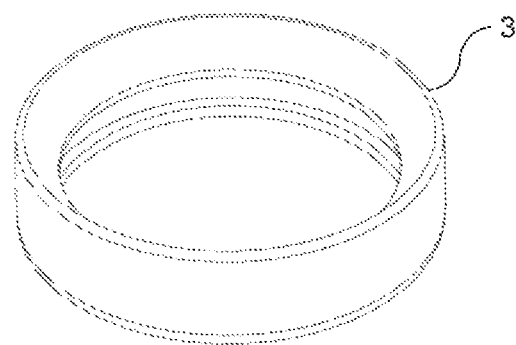
FIG. 6 illustrates the custom molded rubber Seat Seal.

FIG. 6 illustrates the custom molded Seat Seal (3). The seat seal (3) is specifically designed to fit into the groove machined into the seat (9) and adjacent check valve body (10) sealing areas and is the primary sealing means. The seal (3) creates the initial seal, keeping the fluid and gas within the check valve body (10) during all operations.

Figure 7:
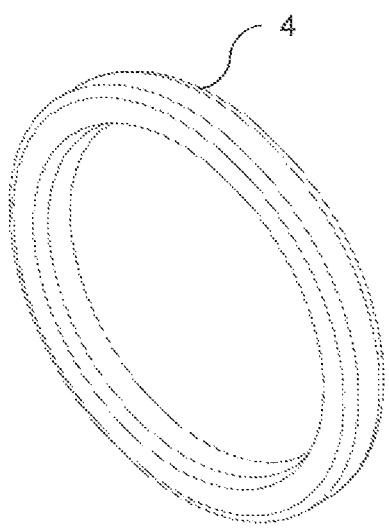
FIG. 7 illustrates the custom molded Bonnet Gasket.
Figure 12:
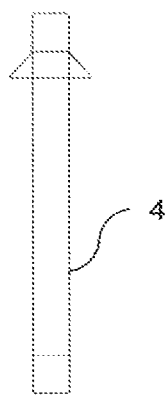
FIG. 12 illustrates the custom molded Bonnet Gasket.

FIG. 7 illustrates the custom molded Bonnet Gasket (4). The bonnet gasket (4) also seen in FIG. 12, is specifically designed to fit into the recess machined into the check valve body (10) and seals against the bonnet (7). This creates a seal to contain pressure within check valve assembly.

Figure 8:
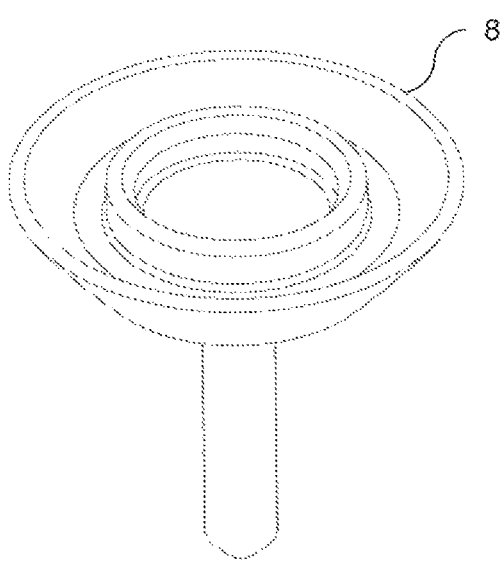
FIG. 8 illustrates an isometric view of the Poppet check valve.
Figure 9:
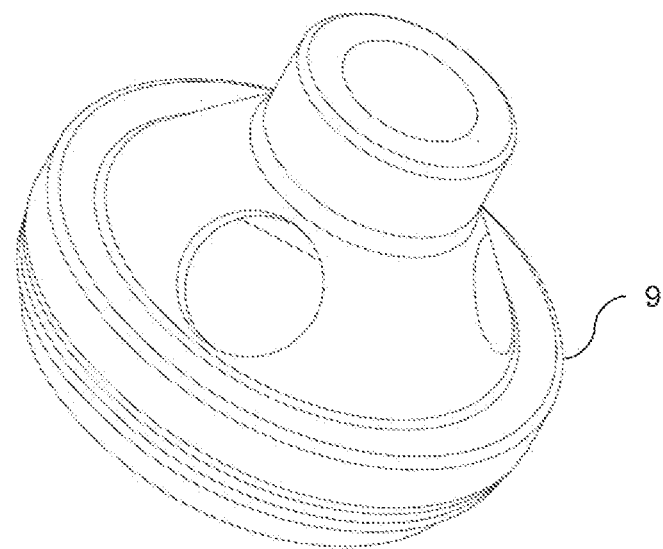
FIG. 9 illustrates an isometric view of the Seat.
Figure 10:
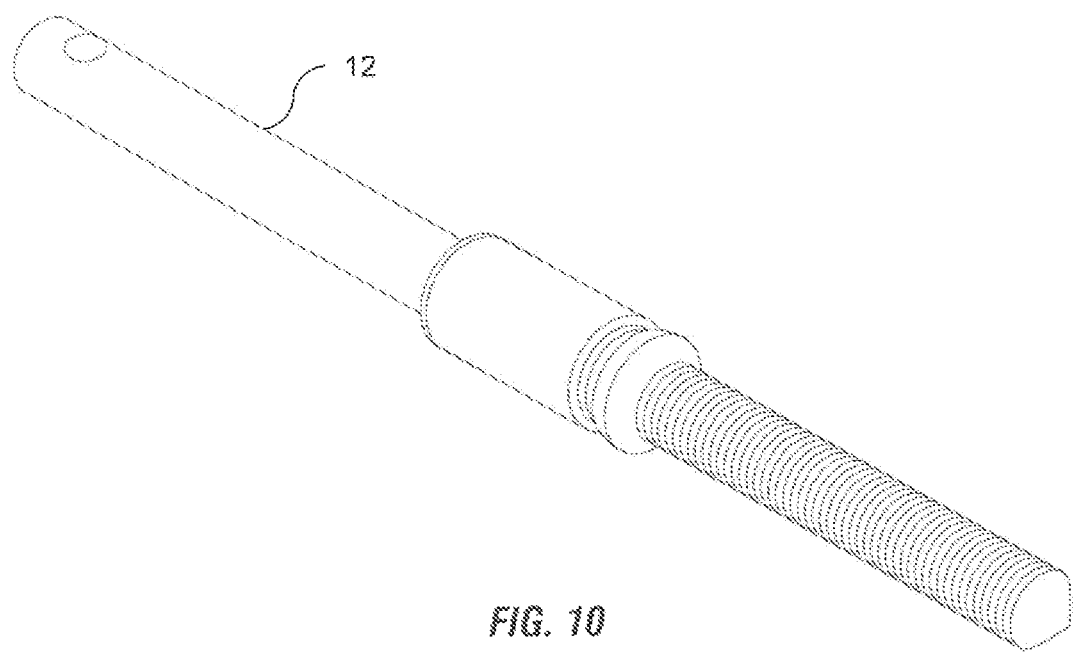
FIG. 10 an isometric view of the Locking Screw.

FIG. 8 illustrates an isometric view of the Poppet (8).
FIG. 9 illustrates an isometric view of the Seat (9).
FIG. 10 illustrates an isometric view of the Locking Screw (12) which works together with the Lock Open Device Body (11). Further details are below relative to FIG. 14.

FIG. 11A the prior art design showing the check valve body (10) without the inventive integral locking screw mechanism. Seen is just the poppet (8) with standard attributes. FIG. 11B illustrates the check valve body (10) with the inventive screw mechanism for comparison.

The check valve body (10) and check valve bonnet (7) are standard items in the industry. The parts associated with the lock mechanism are custom forged.

FIG. 12 illustrates the custom molded Bonnet Gasket (4) and is further described above relative to FIG. 7. Exemplary specifications include a length of about 5.189 inches from top to bottom, with an ID of about 0.58 inch.

Figure 13:
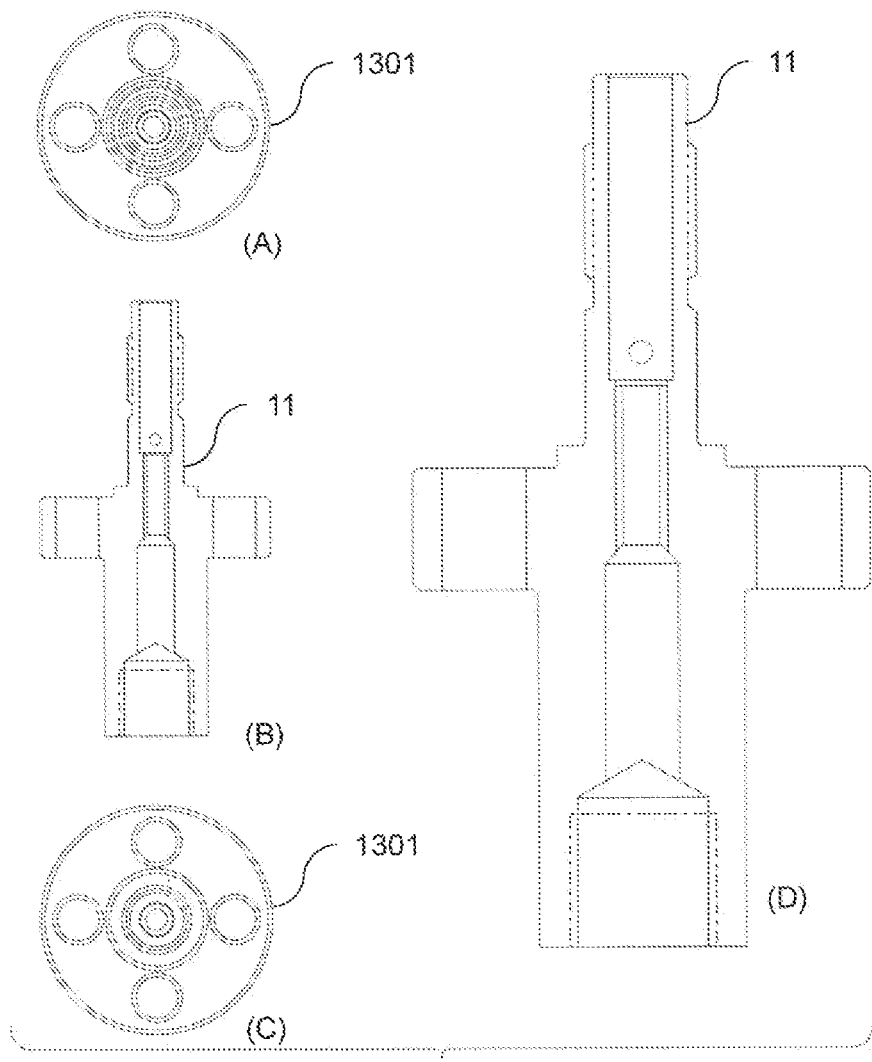
FIG. 13 illustrates an isometric view of the Locking Device Body, with exemplary design attributes.

FIG. 13 illustrates an isometric view of the Locking Device Body (11) in the lock open position, with exemplary design attributes. Shown is the top view (A), cross sectional view (B) and bottom view (C) of the locking device body (11). An enlargement showing the Locking Device Body (D) is displayed therewith, wherein the top region external thread analysis (about 1⅛"-8UN-2A) is seen along the edges of the locking device body (11), and hydrostatic pressure is applied downward towards the knob like regions (1301). Within the knob like regions (1301) are bending moments to assist with the downward pressure applied. The lower region internal thread has a thread analysis of about 2⅛"-8UN-2B, while the central internal region has a thread analysis of bout ½" 13UN-2B. The thread also acts as a retention means for the locking device body (11). Shown in the top cross sectional view are the fastener retention through two (1301) of the four holes.

Figures 14, 15:
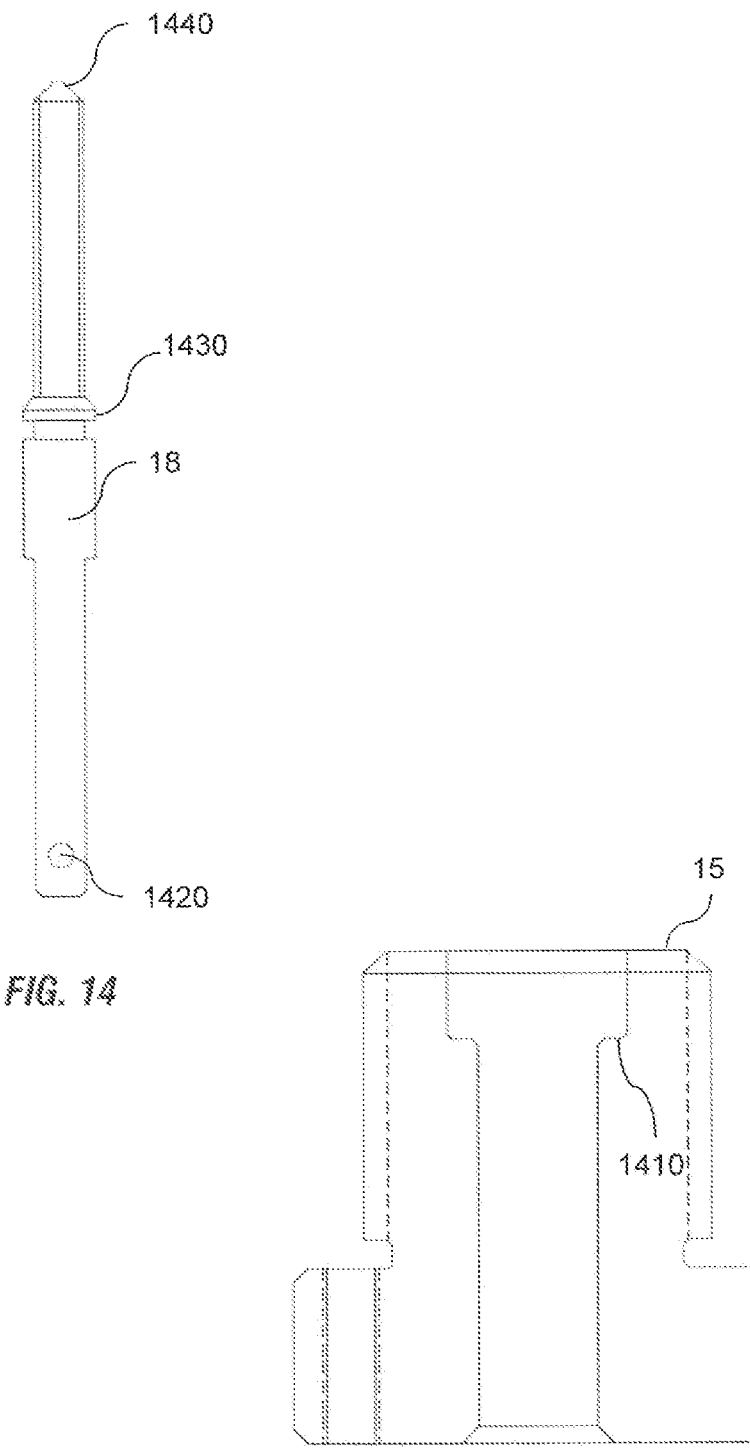
FIG. 14 illustrates an isometric view of the Locking Screw, with exemplary design attributes.
FIG. 15 illustrates an isometric view of the Locking Screw Stop, with exemplary design attributes.

FIG. 14 illustrates a cross sectional view of the Locking Screw (12), with exemplary design attributes. Hydrostatic pressure is applied downward on the tip (1440) and along the sides towards the groove (1430) during testing for use. The pointed end allows for minimal surface contact to aid in the operation of the screw (12). The thread was analyzed to confirm adequate strength to withstand the forces applied during operation. The thread analysis determined ½"-13UN-2A on the top region sides of the screw (12). The groove (1430) shown in the seat screw receives an O-ring (13) that creates a seal between the locking screw (12) and the locking device body (11) to retain pressure inside of the check valve at all times. A shoulder (1410) inside the locking device body (11) matches with the shoulder (18) shown on the locking screw (12). This shoulder feature is intended as a further safety measure to prevent the locking screw (12) from ejecting, should thread failure occur. The locking device body (11) retains the locking screw (12) by means of the thread and the shoulder. The locking screw (12) is connected to the locking screw knob (16) by means of a set screw (17) in the locking screw knob (16) that intersects through a hole (1420) in the end of the locking screw (12). The hole (1420) permits the knob set screw (17) to react with the locking screw (12) thus enabling operation. It is not intended to be operated under hydrostatic pressure. This attachment method is designed to fail if the knob (16) is operated while the check valve is at working pressure. This feature protects the threads of the locking screw (12) and prevents excessive torque application that can be applied by users. The locking device is intended to be operated while the internal mechanisms are not under pressure. Operation is intended to be performed before testing and after testing of the system.

FIG. 15 illustrates a sectional view of the Locking Screw Stop (15), with exemplary design attributes. The shoulder (1410) is seen here and acts as a method to retain the locking screw (12) should a thread failure occur. In the event of a thread failure, the force is transferred from the locking screw (12) to the shoulder (1410). The life span of these parts are not typically tracked by the user. Years of operation can lead to wear and damage to the internally components. An area of concern is the thread of the locking screw (12). The shoulder feature enhances the safety of the inventive lock open device. Not wishing to be bound by theory, it is believed that without the shoulder feature, worn threads could cause failure of the locking screw (12) and the locking screw (12) could eject from the check valve at working pressure causing potential for injury to personnel or damage to equipment. The shoulder feature mitigates that potential by further retaining the locking screw (12) and continue to contain pressure at the O-ring (13).

The inventive device was utilized multiple times for hydrostatic testing. Under simulation tests for anticipated field test pressures, it was found that at least three times in a row, the device withstood the pressures applied, maintained its integrity, and did not leak. Under actual field tests conducted in a 21 day interval for over 12 months, the device withstood field conditions of temperature, and pressure with no loss in integrity.

While the invention is directed to the redesign of the mechanical section of a piece of equipment having a poppet check valve, e.g., a blowout preventer or choke and kill manifold assembly, to allow for a penetration body (here a locking device), one of skill in the art will readily see that this tool can be useful in a variety of applications. Exemplary applications include high pressure pumping systems, production facilities, fluid injection, etc.

The present invention has been described herein with reference to an assembly for use in a drilling rig operation. Although selected embodiments have been illustrated and described in detail, it may be understood that various substitutions and alterations are possible. Those having an ordinary skill in the art and access to the present teachings may recognize additional and various substitutions and alterations are also possible without departing from the spirit and scope of the present invention.

The invention claimed is:
1. A lock open device comprising:
   a locking device body that is attached to a poppet check valve, wherein during a normal operation of the poppet check valve, a poppet of the poppet check valve is attached to a seat of the poppet check valve;
   a locking screw that is positioned inside the locking device body and is in contact with the poppet; and
   a locking screw knob attached to the locking screw, wherein based on a rotation of the locking screw knob in a first direction, a force is applied against the poppet by the locking screw and the poppet is lifted from the seat, thereby modifying the poppet check valve from the normal operation to a locked open operation, and wherein the lifting of the poppet from the seat results in bidirectional flow of fluid or gas in the poppet check valve.

2. The lock open device of claim 1 which operates in a temperature range of −20F to 250F.

3. The lock open device of claim 1 which is suitable for H2S (hydrogen sulfide) service as defined in NACE MR0175.

4. The lock open device of claim 1, wherein based on a rotation of the locking screw knob in a second direction, that is opposite to the first direction, the force from the poppet is removed and the poppet is reattached to the seat, thereby returning the poppet check valve to the normal operation, and wherein the reattachment of the poppet results in unidirectional flow of the fluid or the gas in the poppet check valve.

5. The lock open device of claim 1, further comprising a set screw, wherein the locking screw is attached to the locking screw knob by means of the set screw.

6. The lock open device of claim 1, wherein the bidirectional flow of the fluid or the gas in the poppet check valve enables hydrostatic testing.

7. The lock open device of claim 1, further comprising an o-ring attached on an outer diameter of the locking screw such that the o-ring seals the locking screw against an internal surface of the locking device body.

8. The lock open device of claim 1, wherein the locking screw has a pointed end that is in contact with the poppet.

9. The lock open device of claim 1, further comprising a locking screw stop, wherein the locking screw is attached to the locking screw knob by means of the locking screw stop, and wherein the locking screw is prevented from being ejected from the poppet check valve by the locking screw stop.

10. The lock open device of claim 1, wherein during the normal operation, the locking screw knob is separated from the locking device body, and wherein during the locked open operation, the locking screw knob is flush with the locking device body.

11. The lock open device of claim 1, wherein the locking device body comprises an external thread region in a top portion thereof and one or more internal thread regions in central and lower portions thereof, and wherein the external and internal thread regions act as retention means for the lock open device.

12. The lock open device of claim 1, wherein each of the locking device body and the locking screw comprises a matching shoulder that prevents ejection of the locking screw from the locking device body.

13. An integral lock open device for use with a poppet check valve comprising
 a) a check valve body having an inlet connection end and an outlet connection end, a bonnet attached to a poppet and a seat; and
 b) a lower section housing a locking body device together with a socket head cap screw, a poppet lock screw, a locking screw knob, a lock set screw, and a lock screw stop.

14. The integral lock open device of claim 13, wherein the poppet lock screw has a pointed end and a shoulder.

15. The integral lock open device of claim 14, wherein the locking screw knob is turned clock wise or counter clock wise to place or remove force on the poppet.

16. The lock open device of claim 1, further comprising a set of socket head cap screws, wherein the locking device body is attached to the poppet check valve by means of the set of socket head cap screws.

17. A device comprising:
 a poppet check valve comprising a poppet and a seat, wherein during a normal operation of the poppet check valve, the poppet is attached to the seat; and
 a lock open device attached to the poppet check valve, wherein the lock open device comprising:
  a locking device body that is attached to the poppet check valve;
  a locking screw that is positioned inside the locking device body and is in contact with the poppet; and
  a locking screw knob attached to the locking screw, wherein based on a rotation of the locking screw knob in a first direction, a force is applied against the poppet by the locking screw, and the poppet is lifted from the seat, thereby modifying the poppet check valve from the normal operation to a locked open operation, and wherein the locked open operation results in bidirectional flow of fluid or gas in the poppet check valve.

18. The device of claim 17, wherein the poppet check valve further comprises a seat seal, wherein during the normal operation, the poppet is attached to the seat by means of the seat seal, and wherein during the locked open operation, the lifting of the poppet from the seat results in breaking the seat seal.

* * * * *